United States Patent Office 3,300,848
Patented Jan. 31, 1967

3,300,848
METHOD OF PREPARING OXIDES FOR NEUTRONIC REACTOR CONTROL
Carl F. Leitten, Jr., and Ralph A. Potter, Oak Ridge, and Robert E. McDonald, Anderson County, Tenn., assignors to the United States of America as represented by the United States Atomic Energy Commission
No Drawing. Filed Dec. 24, 1963, Ser. No. 333,234
9 Claims. (Cl. 29—420.5)

The present invention relates generally to nuclear reactor control materials and more particularly to a method for preparing rare earth compounds for use as dispersoids in control elements of nuclear reactors.

Various of the rare earth metals, such as samarium, europium, gadolinium and dysprosium, are quite attractive as potential reactor control materials. However, europium, with its essentially non-burnout character and high neutron absorbing capacity, is probably the most promising of the four and is particularly attractive as a control material in high neutron flux reactors such as the High Flux Iostopes Reactor presently being built at Oak Ridge, Tennessee.

As potential reactor control materials, the most usable form of the rare earth metals is the oxide, such as $Eu_2O_3$, and it has generally been investigated as a dispersoid in structural materials, such as stainless steel. For use as dispersoids in such materials as stainless steel or aluminum it has been found that a particle size range of −100, +325 mesh (149, 44 microns, respectively) is highly desirable to minimize the stringering of the oxide during subsequent cladding of the metal-matrix dispersion by such methods as hot roll cladding. By stringering it is meant that the oxide during the rolling step tends to elongate instead of remaining a distinct particle.

One problem associated with the use of rare earth metal oxides, such as $Eu_2O_3$, as reactor control materials is that the commercially available oxide is, generally, in the form of a chemical precipitate which has been lightly calcined at about 800° C. to the oxide. In this form the oxide has the cubic crystal structure which is not stable at elevated temperatures and which will undergo a phase change to the stable monoclinic crystal structure when heated above about 1050° C. As such, the powder is not readily suitable for use as a powder metallurigical dispersoid in control elements and must be converted from a fluffy, low density powder having an extremely fine particle size to a more dense form which will not undergo phase transformation at elevated temperatures.

A number of methods have been investigated to agglomerate the powdered rare earth oxides, thus increasing both the particle size and density. One such method was to sinter small compacts of the oxide in a hydrogen atmosphere at elevated temperatures. After sintering, the compacts were removed, crushed to a desired mesh size, and screened. However, when the sintered compacts were crushed to a particle size range of −100, +325 mesh, it was found that an extremely large portion, even as high as 70% of the particles, fell outside the desired range, i.e., were smaller than 44 microns (−325 mesh) and consequently could not be used. The high production of fines (below 44 microns) encountered is generally attributed to the fact that the rare earth oxide powder had a tendency to laminate when pressed into compacts. These laminations remained throughout the hydrogen sintering process and the sintered compacts, when crushed, tended to fracture along the laminar planes into thin flakes that required excessive crushing before passing 100 mesh.

Another method that has been used to densify rare earth oxide powders is to sinter compacts of the oxide at elevated temperatures in ambient air. However, a serious drawback to such a process has been the high cost of equipment required to carry it out. Furnaces which are capable of heating a material to a temperature above about 1700° C. and maintaining such temperatures for a long period of time are quite expensive. Another, and perhaps the most serious, drawback is the silicon contamination problem. Due to the use of silicon-containing refractory metals as construction materials or as backup insulation, it is most difficult to maintain a silicon-free environment. Inasmuch as the metal oxide dispersion must be compatible with the metal matrix, silicon, which has been found to cause the metal oxide to react with structural materials such as stainless steel, must be precluded from the melt to prevent deformation and swelling of the compacts.

It is therefore a general object of the invention to provide a method of forming an oxide of uniform character.

It is another object to provide a method for rendering rare earth oxide powders suitable for dispersion in metal-matrix type control elements.

Another object is to provide a method for forming rare earth oxides which, when crushed, form into a large proportion of particles in the desired size range of −100, +325 mesh.

Still another object is to provide a method of forming rare earth oxides having greater strength and density than that produced by prior art methods at a cost substantially below that of the prior art.

A still further object is to provide a method wherein these objects are achieved for a mixture of rare earth oxides and/or other desirable stabilizing oxides.

Additional objects will become apparent hereinafter.

In accordance with the present invention stoichiometric rare earth powders of the class consisting of oxide compounds of rare earth metals, molybdate compounds of rare earth metals, tungstate compounds of rare earth metals, titanate compounds of rare earth metals, and mixtures thereof are produced by melting, in an inert atmosphere, the desired compound to form a reduced rare earth compound melt, solidifying the fused melt, heating the fused compound in an oxidizing atmosphere to a temperature of at least 1000° C. to achieve stoichiometry and then crushing the formed stoichiometric rare earth compound to produce stoichiometric rare earth powders in the particle size range of from 44 to 149 microns. Rare earth compounds of the class mentioned above processed by this method have been found to crush easily into a more dense, stronger product having better than 70% of the particles in the desired particle size range of −100, +325 mesh.

Preparation of the oxide powders is effected by first pressing the as-received oxide powder into cylindrical pellets to facilitate handling and then heating the pellets in a suitable furnace, e.g., an arc furnace, under an inert atmosphere, such as argon, to a temperature above the melting point of the oxide to form a fused oxide. After solidification the fused oxide is heat-treated in air from room temperature to a temperature of about 1000° C. and then crushed and screened. Similarly, stoichiometric powders of the molybdate, tungstate and titanate compounds of the rare earth metals are produced by first mixing the as-received rare earth oxide with either molybdenum oxide, tungsten oxide, or titanium dioxide prior to the arc melting step and then processed the same as described for the oxides above.

While it is well known that melting converts nondense materials to hard and more dense materials, it is highly irregular that the material produced by this method would form as low a percentage of fine material as is formed upon crushing. Quite to the contrary, it could be expected as prior art methods have shown that crushing such hard materials would result in 50–70% fines.

While it is to be understood that applicants do not wish to be bound by a rigid theory, it is thought that the enhanced crushing characteristics of the product are due to the combined steps of slight reduction of the oxide during melting and reoxidation of the oxide during the heat treatment in air to form stoichiometric oxide. During the melting step, the as-received oxide apparently lost some oxygen which was restored during the heat treatment in air. An X-ray powder diffraction analysis of the fused oxide melt showed not only the monoclinic oxide form, which is the desired stable configuration, but also a second phase. Analysis of the fused oxide after the heat treatment showed the second phase to have disappeared and suggested the formation of a lower oxide during melting with subsequent reoxidation during heat treatment in air.

While the method of the invention may be varied by those skilled in the art, it will be appreciated that certain operating parameters afford optimum results and are preferred. The as-received powder, whether it be a single rare earth metal oxide, mixes of particular rare earth oxides, or rare earth oxides mixed with stabilizing oxides, should be of high purity stock, substantially free of contaminants which might adversely affect their nuclear properties, such as the thermal neutron adsorption cross section.

In the first step of the process the powder is pressed under a pressure of from 5 to 10 t.s.i. into pellets of accommodating size, depending upon the size and capacity of the furnace; applicants prefer pellets of about 100 grams each. Where the rare earth oxide is combined with stabilizing oxides such as tungsten and molybdenum, the combination may be effected by mixing about the required amounts, as for example, one mole of stabilizing oxide to five moles of rare earth oxide. For a more complete disclosure of these stabilized rare earth oxides, reference is made to a copending application, S.N. 238,065, now U.S. Patent No. 3,117,372, in the names of Robert A. McNees and Ralph A. Potter, for "Stabilized Rare Earth Oxides for a Control Rod and Method of Preparation." Also, in the case where the rare earth oxide is stabilized with titanium dioxide, the combination may be effected by mixing about the required amounts, as for example, two moles of stabilizing oxide to one mole of rare earth oxide.

The pressed oxide is then melted by heating the compact above its melting point to effect fusion of the constituents. While the melting point of a number of the rare earth metals, or mixes thereof, is not known with certainty, it has been found that they generally fall within the temperature range of from 2000° C. to 2500° C., with the temperature range of the stabilized rare earth oxides falling between 1500° C. and 1800° C. Also, it is preferred that the arc melting be carried out in an inert atmosphere, such as argon, and under a dynamic vacuum, e.g., about 10–20 mm. Hg.

Where the melting of the compacts is effected by arc melting, it is preferred that non-consumable tungsten electrodes and a water-cooled copper hearth be used to preclude any additional silicon from being introduced into the melt as is the case in prior art processes wherein silicon-containing refractory metals are utilized as furnace construction materials.

After the compacts are melted the fused melt is solidified; then it is heated in an oxidizing atmosphere to a temperature of at least 1000° C., or until stoichiometry is achieved, and thereafter cooled to room temperature prior to crushing.

The reoxidized compact is then comminuted by crushing the oxide to a particle size of less than 149 microns, i.e., until the entire material passes 100 mesh. In order to avoid excessive fines induced by the crushing operation, impact-type strokes should be used along with intermediate screening of the comminuted particles.

Fabrication of a metal-matrix type control element is accomplished by blending the processed stoichiometric rare earth powders with a powdered structural metal, such as aluminum or stainless steel, cold compacting the mixture, and pressing into a compact. The compacts are sintered, allowed to cool, and then clad. Although not critical, it is preferred that the structural metal comprise at least 50 v/o of the resulting compact, preferably above 55 v/o, and be in a finely divided state. For both the aluminum and stainless steel, powders having a particle size of about 20–30 microns have been quite suitable. It is to be understood that the "sintering" step will vary with each metal selected as well as other parameters, such as pressure, temperature, and time. In the case of europium oxide mixed with aluminum the sintering is effected by heating in vacuo the compacts to a temperature of about 590° C., while with europium oxide and stainless steel it is effected by heating the compacts in a hydrogen atmosphere to a temperature of about 1150° C.

Further illustration of the quantitative aspects and procedures of the present invention is provided in the following examples. Example I shows the formation of stoichiometric europium oxide powder by this method and Example II shows its preparation by a prior art method.

EXAMPLE I

Approximately 400 grams of $Eu_2O_3$ powders were pressed into two cylindrical pellets of about 200 grams each and then melted at about 2050° C. in an arc furnace under a dynamic argon (10–20 mm. Hg) atmosphere. Nonconsumable tungsten electrodes and a water-cooled copper hearth were used. After cooling, the fused oxide was heated in air from room temperature up to about 1300° C. A thermogravimetric analysis was performed on the fused oxide during the heat treatment in air and showed a weight gain commencing at approximately 400° C. and stopping at about 1000° C. The heating rate during the analysis was approximately 25° C. per minute and the total weight gain was 0.25%. The color of the fused oxide changed from black to tan during the heat treatment in air and was, along with the weight gain, indicative of reoxidation of the europium oxide. The heat-treated oxide was crushed with mortar and pestle using only impact-type strokes and intermediate screening to a particle size within the range of −100, +325 mesh. Chemical analysis of the final product indicated a product having greater than 99.5% $Eu_2O_3$ and a silicon content of 100 p.p.m.

EXAMPLE II

Approximately 100 grams of $Eu_2O_3$ powder was pressed into a single pellet and heat-treated in hydrogen for three hours at a temperature of 1750° C. Thereafter it was comminuted and screened to a particle size range of −100, +325 mesh.

The results of Examples I and II are shown in Table I below. The arc-melted oxide crushed easily to produce particles wherein better than 70% were in the desired −100, +325 mesh range with the remainder being fines, while the hydrogen-sintered oxide yielded only 30–35% particles within the desired mesh range. Also shown is the size distribution of the crushed product as broken down into three intermediate mesh fractions within the desired range.

Table I
SCREEN ANALYSES
[Material crushed to −100, +325 mesh]

| Method of Processing | Crushing Yield −100, +325 mesh fraction (wt. percent) | Size Distribution, wt. percent Mesh | | | Particle Appearance |
|---|---|---|---|---|---|
| | | −100, +140 | −140, +200 | −200, +325 | |
| Example II | 30–35 | 36.7 | 22.4 | 40.9 | Broad, flaky, laminar. |
| Example I | 70–75 | 46.7 | 22.9 | 30.4 | Angular, chunky, irregular. |

Examples III and IV show the applicability of this process to producing highly corrosion resistant europium molybdate and samarium molybdate compounds.

EXAMPLE III

Approximately 100 grams of 85% $Eu_2O_3$-15% $MoO_3$ (wt. percent) was mixed and pressed at 2000 p.s.i. into a single pellet. The pellet was then melted at 1700° C. in an arc furnace under a dynamic (10–20 mm. Hg) atmosphere and the fused oxide treated as in Example I. A weight gain of 0.9% was observed during the heat treatment and the fused oxide again crushed easily to give better than 70% of the particles in the desired range of −100, +325 mesh. An X-ray diffraction pattern of the product was very similar to that of the desired stabilized $Eu_5MoO_{12}$ compound.

EXAMPLE IV

Approximately 100 grams of a mixture of 85% $Sm_2O_3$-15% $MoO_3$ (wt. percent) was prepared as in Example I with the oxide again crushing easily to yield better than 70% of the particles in the desired range of −100, +325 mesh.

Example V shows the applicability of this process to the production of rare earth oxide mixtures. It further demonstrates the production potential of such a process.

EXAMPLE V

Approximately 2000 grams of a mixture of 45% $Gd_2O_3$-45% $Sm_2O_3$ with 10% other lanthanon oxides (wt. percent) were pressed into 10 pellets of 200 grams each. The pellets were then processed as in Example I. Similarly, approximately 100 grams of the same mixture was pressed into a single pellet and heat-treated in hydrogen at 1600° C. for 3 hours. The arc-melted oxide mixture crushed easily to produce particles wherein 69% (wt. percent) were in the range of −100, +325 mesh, while the hydrogen-sintered oxide mixture yielded only between 31 and 35% (wt. percent) within the mesh range.

Example V demonstrates the excellent yields afforded by applicants' process as against prior art methods. Only around 620 grams of feed material was unsuitable for use in fabricating control elements when processed by applicants' process as against over 1300 grams that would have been lost if processed by prior art methods. This is especially beneficial when one looks at the high cost of such feed materials as the rare earth metals. It will be appreciated that these fines could be reprocessed to cut down on losses. However, such reprocessing would involve more handling of the material and more material losses.

Example VI demonstrates the fabrication of a europium oxide-aluminum metal control element.

EXAMPLE VI

Approximately 151 grams of −325 mesh arc-melted 33 wt. percent europium oxide made in accordance with Example I was dry-blended with 91 grams of −100 mesh aluminum powder for 3 hours. The aluminum powder had been outgassed at 590° C. for 3 hours at a vacuum of about 10 microns prior to blending. The blended mixture was then cold compacted and pressed at about 45 t.s.i. into a single compact. The compacts were then vacuum degassed at 590° C. for 1½ hours at a vacuum of about 10 microns and then incorporated into a picture frame billet comprising a pair of aluminum-clad type 6061 aluminum cover plates and a type 6061 aluminum frame into which the compacts were inserted. The cover plates were welded and the billet was leak tested, evacuated, sealed, and preheated for 2 hours at 500° C. The billet was then hot rolled using a 10% reduction in thickness during each pass until the desired plate thickness was achieved.

Example VII demonstrates the fabrication of a europium oxide-element type 304 stainless steel control element.

EXAMPLE VII

A mixture of −325 mesh europium oxide made in accordance with Example I and −100 mesh elemental type 304 stainless steel powder containing 38 wt. percent europium oxide and 62 wt. percent type 304 stainless steel in elemental form was dry-blended for 3 hours. The blended mixture was cold-compacted and pressed at about 45 t.s.i. into a single compact and then sintered in hydrogen at 1150° C. for 1¼ hours. The same procedure was used as in Example VI for incorporating the compacts into the frame except type 304 stainless steel was employed. The billet was then hot-rolled at 1150° C. using 10% reduction per pass until the desired thickness was reached.

It is to be understood that the foregoing examples are merely illustrative and are not intended to limit the scope of this invention, but that the invention should be limited only by the scope of the appended claims.

What is claimed is:

1. A method of preparing stoichiometric rare earth powders of the class consisting of oxide compounds of rare earth metals, molybdate compounds of rare earth metals, tungstate compounds of rare earth metals, titanate compounds of rare earth metals, and mixtures thereof which comprises melting in an inert atmosphere said compounds to form a reduced rare earth compound melt, solidifying the fused melt, heating said fused compound in an oxidizing atmosphere to a temperature of at least 1000° C. to achieve stoichiometry and crushing the formed stoichiometric rare earth compound to produce said stoichiometric rare earth powders in the particle size range of from 44 to 149 microns.

2. The method of claim 1 wherein said rare earth metals are of the class consisting of samarium, europium, gadolinium, and dysprosium.

3. The method of claim 1 wherein said oxide compound of rare earth metals is europium oxide.

4. The method of claim 3 wherein said europium oxide is stabilized with oxides of a metal selected from the group consisting of tungsten, molybdenum, and titanium.

5. A method for preparing a nuclear reactor control element which comprises melting in an inert atmosphere compounds of the class consisting of oxide compounds of rare earth metals, molybdate compounds of rare earth metals, tungstate compounds of rare earth metals, titanate compounds of rare earth metals, and mixtures thereof to form a reduced rare earth compound melt, solidifying the fused compound melt, heating said fused compound in an oxidizing atmosphere to a temperature of at least 1000° C. to achieve stoichiometry, crushing the formed stoichiometric compound, recovering particles of said stoichiometric compound in the size range of from 44 to 149 microns, mixing said recovered powders with a powdered metal, cold compacting said mixture, pressing the resulting compact, sintering said compact and cladding the resulting sintered compact.

6. The method of claim 5 wherein said rare earth metals are of the class consisting of samarium, europium, gadolinium and dysprosium, said powdered metal is finely divided stainless steel, and said sintering is effected at a temperature of about 1150° C. in a hydrogen atmosphere.

7. The method of claim 5 wherein said rare earth metals are of the class consisting of samarium, europium, gadolinium and dysprosium, said powdered metal is finely divided aluminum and said sintering is effected in vacuo at a temperature of about 590° C.

8. The method of claim 5 wherein said oxide compound of rare earth metals is europium oxide, said powdered metal is finely divided aluminum, said sintering is effected in vacuo at a temperature of about 590° C. and said sintered compacts are picture-frame-roll-clad in aluminum.

9. The method of claim 8 wherein said europium oxide is stabilized with oxides of a metal selected from the group consisting of tungsten, molybdenum and titanium.

References Cited by the Examiner

UNITED STATES PATENTS

| 2,289,570 | 7/1942 | Boegehold | 29—155.6 XR |
| 2,767,087 | 10/1956 | Cavanagh. | |
| 2,866,741 | 12/1958 | Hausner. | |
| 3,117,372 | 1/1964 | NcNees et al. | 29—470 |

JOHN F. CAMPBELL, *Primary Examiner.*

CHARLIE T. MOON, P. M. COHEN, *Examiners.*